Dec. 24, 1968    R. R. DAY ET AL    3,417,635
TRANSMISSION CONTROL MECHANISM
Filed July 1, 1966    2 Sheets-Sheet 1

INVENTORS
RALPH R. DAY
RAYMOND W. FABERE'
KARL J. MOGK
BY
ATTORNEYS

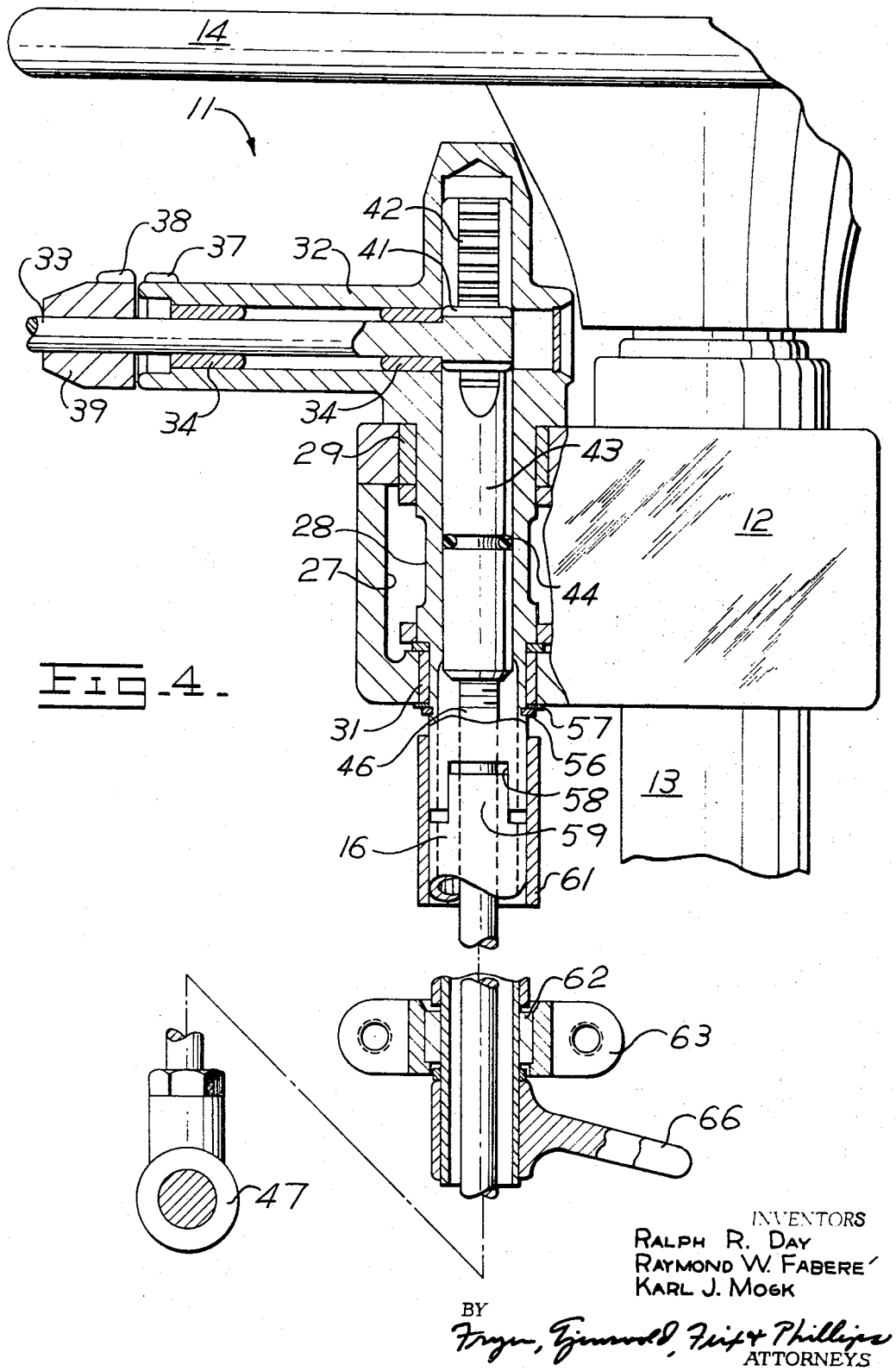

United States Patent Office 3,417,635
Patented Dec. 24, 1968

3,417,635
TRANSMISSION CONTROL MECHANISM
Ralph R. Day, Aurora, and Raymond W. Faberé and Karl J. Mogk, Naperville, Ill., assignors to Caterpillar Tractor Co., Peoria, Ill., a corporation of California
Filed July 1, 1966, Ser. No. 562,170
4 Claims. (Cl. 74—484)

ABSTRACT OF THE DISCLOSURE

For a heavy motor driven vehicle a single shift control lever mounted on the steering column provides reversing direction with no need to pass through any other range. This control handle is manipulated in two independent ways: swingable parallel to the steering wheel between forward and reverse positions and turned about its own axis to change speed ranges, the latter action requiring more rotation to shift between successive drive ratios than can be effected by the operator without releasing and regrasping the control handle knob.

---

This invention relates to motor driven vehicles and more particularly to a simplified and more convenient mechanism for manually changing transmission settings thereof.

Heavy motor driven vehicles of the type employed in agricultural and construction operations generally have a transmission which provides for reversing the vehicle direction and for several speed ranges. The shifting controls heretofore used in such equipment have required an unnecessarily complex pattern of manipulations on the part of the operator. These can be fatiguing and in some instances may contribute to mistakes in effecting the desired transmission setting. It is a further characteristic of many prior transmission controls that the setting must be moved through a progression of unwanted ranges in order to reverse direction. This may prevent the desired swift and smooth shifting and further contributes to possible operator error.

Other forms of prior transmission control may require two separate control levers or a floor mounted lever either of which restricts operator space and substantially increases the effort needed to control the vehicle. Still a further characteristic of many prior controls is that heavy detents may be needed at each of the several transmission settings so that the operator can sense when the control levers are at the proper positions. This contributes to precision in operating the equipment but also introduces fatiguing resistance to control lever manipulations.

The present invention overcomes the several adverse characteristics of prior controls as discussed above by providing a novel mechanism coupling a single control lever, mounted on the steering column, to the transmission in an arrangement which provides for reversing direction without necessarily passing through any other range, which has a much simplified one-dimensional shifting pattern combined with rotational control, and which does not require heavy resistance creating detents to indicate positions.

The control lever in the present invention may be conveniently mounted to project sidewardly from the steering column within easy reach of the operator's hand and may be manipulated in two independent ways. In particular, the lever is swingable in a direction substantially parallel to the steering wheel between a forward and a reverse position and is twisted about its own axis to change ranges. Mechanism attached to the steering column and extending from near the base thereof couples the control lever to the transmission control valve.

Accordingly it is an object of this invention to provide a simplified, more convenient transmission control for heavy motor operated vehicles.

It is a further object of the invention to provide a safer, less error prone and less fatiguing control element for the transmission of motor driven vehicles.

It is still another object of the invention to provide a single transmission control which may be repositioned from forward to reverse and back at a selected speed range without passing momentarily through other ranges.

The invention, together with further objects and advantages thereof, will be better understood by reference to the following specification taken in conjunction with the accompanying drawings, of which:

FIG. 4 is a view, partially in section, showing internal details of elements of the invention associated with the steering column.

Figure 1:
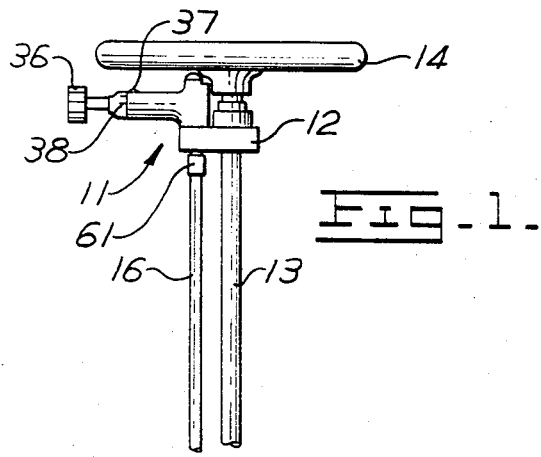
FIG. 1 shows the steering wheel and the upper portion of the steering column of a motor vehicle with the transmission control lever of the present invention thereon.

Referring now to the drawing and particularly to FIG. 1 thereof, the control lever assembly 11 is secured by a bracket 12 to the upper portion of a slightly inclined steering column 13 which carries a vehicle steering wheel 14 at the upper end thereof.

Figure 2:
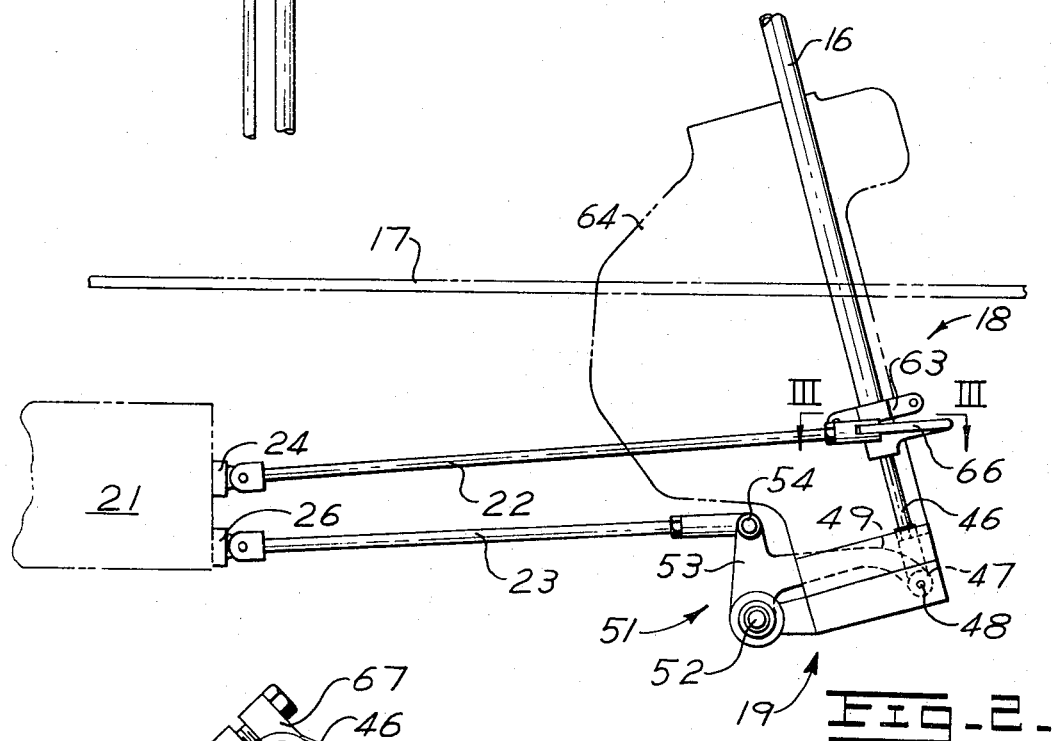
FIG. 2 is a side elevation view of the lower portion of the steering column of FIG. 1 showing additional elements of the transmission control.
Figure 3:
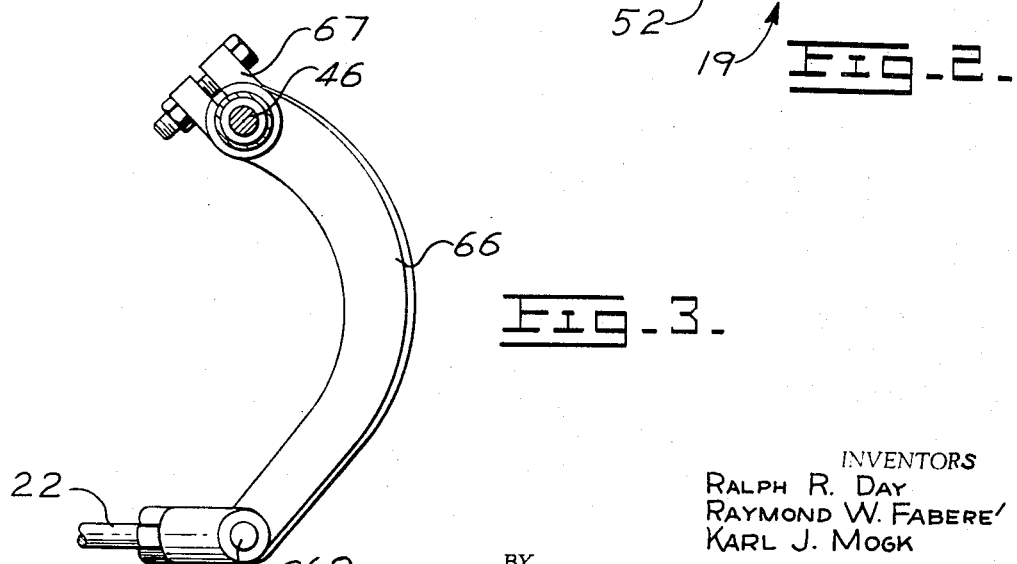
FIG. 3 is an enlarged section view taken along line III—III of FIG. 2 and showing details of certain of the elements thereof.

As shown in FIGS. 2 and 3, a tubular shaft 16 extends downwardly from control lever assembly 11 to a point below the vehicle deck 17 where linkage assemblies 18 and 19 transmit control lever manipulations to the vehicle transmission 21 through connecting rods 22 and 23 respectively.

The transmission 21, which is situated rearwardly from the base of steering column 13, is of a hydraulically operated, spool valve controlled type known to the art. Such transmissions have a first forwardly projecting spool valve control element 24 which is moved longitudinally from a first to a second position to reverse the transmission. A second forwardly projecting spool valve control element 26, situated beneath valve control element 24, has a series of longitudinal positions corresponding to the number of speed ranges of the transmission.

Considering now the detailed structure of the mechanism with reference to FIG. 4 in particular, bracket 12 is rigidly secured to the steering column 13, a short distance below steering wheel 14, and has a sidewardly projecting portion with a passage 27 therethrough, the passage being parallel to the steering column. A rotatable control lever support 28 extends through passage 27 and is journalled therein by upper and lower bearings 29 and 31, respectively. Support 28 extends upwardly from bracket 12 to a level immediately below steering wheel 14 and has a tubular arm 32 which projects sidewardly in a direction substantially parallel to the plane of the wheel.

A control lever shaft 33 extends axially through arm 32 and is journalled for rotation therein by spaced apart annular bushings 34. Referring now to FIG. 1 in conjunction with FIG. 4, the outer end of control lever shaft 33 projects from the end of support arm 32 and terminates in an enlarged knob 36 which facilitates manipulation by an operator.

To indicate visually the rotational setting of the shaft 33, a small fixed reference marker 37 is secured to the upper side of the outer end of support arm 32 and a series of range indicia elements 38 are disposed at spaced annular intervals around the circumference of a collar 39 which is secured to lever shaft 33 adjacent the end of support arm 32.

The above described structure allows an operator to swing control lever shaft 33, within a plane substantially parallel to that of the steering wheel 14, between two positions which correspond to forward and reverse positions of the vehicle transmission. The operator may also readily rotate the control shaft 33 about its own axis between a series of speed range positions as indicated by aligning a selected one of the indicia elements 38 with reference marker 37. To maximize convenience in making these manipulations, the bracket 12, lever support 28, control shaft 33, and knob 36, are proportioned so that the knob is within fingertip reach of the rim of the steering wheel 14. Thus the operator's hand need not leave the immediate vicinity of the steering wheel in the course of making any required changes in transmission setting.

Considering now the mechanism through which the above described manipulations of the control lever 33 are transmitted to the transmission and with reference again to FIG. 4 in particular, a pinion gear 41 is formed on the inner end of control lever shaft 33 and engages a rack 42 formed on the upper end of a rod 43 which is slidably disposed within the control lever support 28. A seal 44 encircles rod 43 within support 28 to seal lubricant therein. A smaller diameter rod 46 extends downwardly from rod 43 within the tubular shaft 16 which parallels the steering column 13 and has an annulus 47 at the lower end.

Referring now to FIG. 2 in conjunction with FIG. 4, a pivot pin 48 couples the annulus 47 to a first arm 49 of a lever 51, the opposite end of the lever being pivotably connected to a fixed point on the vehicle chassis by a second pivot pin 52. Lever 51 has a second shorter arm 53, substantially at right angles to the first arm 49, which is connected by a pivotable coupling 54 to the end of connecting rod 23 and thus to the range selector spool valve control element 26 of transmission 21.

Thus rotation, by the operator, of the control knob 36 selectively translates the range selector spool valve control element 26 through the above described action of pinion gear 41, rack 42, rods 43 and 46, lever 51 and connecting rod 23. It is very advantageous from the standpoint of ease of control, and for safety reasons, that the foregoing elements be proportioned to require a substantial degree of turning of the knob 36 to change between successive ranges. In the present embodiment, seventy-two degrees of rotation of the knob 36 are required to change between adjacent ranges. This means that the operator must re-orient his hand to move to each successive range setting, thereby reducing the likelihood of unintentional shifting through several speed ranges at once.

Referring now to FIG. 4 in particular, the pivoting motion of control lever shaft 33, between forward and reverse positions, rotates lever support 28. The support 28 projects a short distance below the bracket 12 and a clip ring 56 and washer 57 encircle the support immediately below the bracket to hold the support and bearing 31 therein. The downwardly projecting lower end of support 28 has a transverse groove 58 into which a tongue 59 at the upper end of shaft 16 fits, a short sleeve 61 being disposed around the juncture of the two members. This form of coupling transmits angular movement of support 28 to shaft 16 while allowing for a small amount of axial movement therebetween.

Referring now again to FIG. 2 in conjunction with FIG. 4, the lower portion of shaft 16 is held by a bearing 62 within a clamp 63 which is secured to the steering gear housing 64 in this embodiment.

Below clamp 63, an arm 66 projects in a generally radial direction from shaft 16, the arm being secured to the shaft by a suitable clamping means 67 shown in FIG. 3. The outer end of the arm 66 is joined to connecting rod 22 by a pivot coupling 68. Arm 66 has an arcuate configuration in the present embodiment in order to avoid nearby elements of a particular model of vehicle; however in many instances the arm may be straight.

Thus through support 28, shaft 16, arm 66 and connecting rod 22, a swinging of the control lever 33 effects an axial movement of the transmission spool valve control element 24 between the forward and reverse positions. It should be observed that this shifting may be done independently of any shifting of speed range or simultaneously therewith according to the operator's wishes. Both types of transmission setting changes are made through a single conveniently situated control knob and it is unnecessary to move through a series of speed changes in order to reverse direction.

What is claimed is:

1. A control mechanism for manually changing the setting of a vehicle transmission of the class having a first control element movable between first and second positions corresponding to the forward and reverse directions of said vehicle and having a second control element movable between a plurality of positions corresponding to a plurality of speed ranges, said control mechanism comprising a shift lever support having a rotatable member therein, a shift lever having a shaft with a first end extending into said support and coupled to said member for turning said member by swinging motion of said shift lever and shift lever support to effect changes between said forward and reverse settings of said transmission, said shift lever shaft being rotatable about its own longitudinal axis to effect changes of speed range, and having a second end adapted to be manipulated by the operator of said vehicle, a first motion transmitting means coupling said rotatable member to said first control element of said transmission for moving said first control element between said first and second positions thereof in response to said swinging of said shift lever, and a second motion transmitting means coupling said shift lever shaft and said member to said second control element of said transmission for moving said second control element between said plurality of positions thereof in response to rotation of said shift lever shaft, said swinging motion of said shift lever shaft to change drive direction and said rotation thereof about its own axis to change speed range being independent of each other.

2. A control mechanism for manually changing the setting of a vehicle transmission of the class having a first control element movable between first and second positions corresponding to the forward and reverse directions of said vehicle and having a second control element movable between a plurality of positions corresponding to a plurality of speed ranges, said control mechanism comprising a shift lever support having a rotatable member therein, a shift lever having a shaft with a first end extending into said support and coupled to said member for turning said member by swinging motion of said shift lever and shift lever support to effect changes between said forward and reverse settings of said transmission, said shift lever shaft being rotatable about its own own longitudinal axis to effect changes of speed range, and having a second end adapted to be manipulated by the operator of said vehicle, a first motion transmitting means coupling said rotatable member to said first control element of said transmission for moving said first control element between said first and second positions thereof in response to said swinging of said shift lever, and a second motion transmitting means coupling said shift lever shaft and said member to said second control element of said transmission for moving said second control element between said plurality of positions thereof in response to rotation of said shift lever shaft, said second motion transmitting means requiring a greater degree of rotation of said shift lever shaft to move between successive speed ranges than can normally be effected by the operator of said vehicle without releasing and regrasping said shift lever.

3. A control mechanism for a vehicle transmission in which the control mechanism includes a shift control lever with a shaft which is rotated about its own axis to change drive ratios of the transmission wherein said control lever requires more rotation to shift between successive drive ratios than can be effected by the operator without releasing and regrasping said control lever.

4. A control mechanism for a vehicle transmission as defined in claim 3 wherein said control lever requires about 72° of rotation to shift between successive drive ratios.

References Cited

UNITED STATES PATENTS

| | | | |
|---|---|---|---|
| 2,312,975 | 3/1943 | Peterson | 74—484 X |
| 1,331,426 | 2/1920 | Fergus | 74—484 |
| 1,794,133 | 2/1931 | Anderson | 240—61.13 |
| 2,303,562 | 12/1942 | Kurtz | 74—484 |
| 2,861,465 | 11/1958 | Winkle et al. | 74—484 X |

FRED C. MATTERN, *Primary Examiner.*

CAROLYN F. GREEN, *Assistant Examiner.*

U.S. Cl. X.R.

74—543